United States Patent
Morgan et al.

(10) Patent No.: US 12,373,644 B2
(45) Date of Patent: Jul. 29, 2025

(54) EVALUATING TRANSCRIPTS THROUGH REPETITIVE STATEMENT ANALYSIS

(71) Applicant: Calabrio, Inc., Minneapolis, MN (US)

(72) Inventors: Dylan Morgan, Minneapolis, MN (US); Boris Chaplin, Medina, MN (US); Kyle Smaagard, Forest Lake, MN (US); Chris Vanciu, Isle, MN (US); Laura Cattaneo, Rochester, MN (US); Matt Matsui, Minneapolis, MN (US); Catherine Bullock, Minneapolis, MN (US)

(73) Assignee: Calabrio, Inc., Minneapolis, MN (US)

( * ) Notice: Subject to any disclaimer, the term of this patent is extended or adjusted under 35 U.S.C. 154(b) by 0 days.

(21) Appl. No.: 18/065,589

(22) Filed: Dec. 13, 2022

(65) Prior Publication Data

US 2024/0193364 A1   Jun. 13, 2024

(51) Int. Cl.
*G06F 40/289*     (2020.01)
*G06F 40/30*     (2020.01)

(52) U.S. Cl.
CPC .......... *G06F 40/289* (2020.01); *G06F 40/30* (2020.01)

(58) Field of Classification Search
CPC ............................ G06F 40/30; G06F 40/289
See application file for complete search history.

(56) References Cited

U.S. PATENT DOCUMENTS

| | | | | |
|---|---|---|---|---|
| 6,205,244 | B1 * | 3/2001 | Bawolek | G01J 3/524 382/167 |
| 7,593,587 | B1 * | 9/2009 | Rosario | G06T 7/001 348/208.4 |
| 10,607,611 | B1 * | 3/2020 | Shellef | G10L 15/01 |
| 2009/0209833 | A1 * | 8/2009 | Waagen | G06T 7/0016 382/218 |
| 2015/0032448 | A1 * | 1/2015 | Wasserblat | G06F 16/60 704/235 |
| 2015/0269932 | A1 * | 9/2015 | Evanini | G06F 40/30 704/235 |
| 2019/0312973 | A1 * | 10/2019 | Engelke | G10L 15/183 |
| 2020/0111545 | A1 * | 4/2020 | Syeda-Mahmood | G16H 50/70 |
| 2020/0372066 | A1 * | 11/2020 | Saggi | G06N 20/00 |

(Continued)

FOREIGN PATENT DOCUMENTS

WO    WO-2022248145 A1 * 12/2022    ........ G01N 21/8806

*Primary Examiner* — Kevin Ky

(57) ABSTRACT

Aspects of the present disclosure relate to evaluating agent performance during interactions with a customer by generating a repeatability metric based on statements in an associated interaction transcript. The repeatability metric is a performance indicator that quantifies the amount of repetition an individual experiences or utilizes during an interaction between the agent and the customer. The repeatability metric may be calculated by analyzing a transcript and the associated metadata to identify repetitive statements within the transcript. Once a repeatability metric is calculated it may be aggregated across a plurality of levels within a contact center and within the wider enterprise context to improve customer-agent interactions. Thus, the insights provided by the repeatability metric may highlight areas where additional agent training is required, improve agent response time, and increase customer satisfaction with their contact center experience.

14 Claims, 6 Drawing Sheets

(56) References Cited

U.S. PATENT DOCUMENTS

| | | | |
|---|---|---|---|
| 2021/0065582 A1* | 3/2021 | Liao | G10L 15/22 |
| 2021/0103635 A1* | 4/2021 | Liao | G06V 40/174 |
| 2021/0367801 A1* | 11/2021 | Rajamani | G10L 15/22 |
| 2022/0050003 A1* | 2/2022 | Brown | G01L 25/003 |
| 2022/0103683 A1* | 3/2022 | Engelke | H04M 3/42391 |
| 2022/0343790 A1* | 10/2022 | Krishnaswamy | G09B 17/003 |
| 2023/0030870 A1* | 2/2023 | Qu | G06F 16/3344 |
| 2023/0177721 A1* | 6/2023 | Mouti | G06T 7/74 |
| | | | 382/103 |
| 2023/0197105 A1* | 6/2023 | Tanuku | G06F 40/20 |
| | | | 704/235 |
| 2024/0233116 A1* | 7/2024 | Melandri | H04N 23/90 |

* cited by examiner

US 12,373,644 B2

EVALUATING TRANSCRIPTS THROUGH REPETITIVE STATEMENT ANALYSIS

BACKGROUND

As the marketplace has expanded globally, contact centers have emerged as a necessary aspect of a business's interaction with their customers. However, evaluating a contact center's agents can be a challenging task requiring manual processing of individual transcripts and recordings to understand how well agents interact with customers over time. Relying on manual review of agent interactions may not generate a true representation of customer-agent exchanges and limit the ability of contact centers to improve the quality and training of agents overall.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to evaluating agent performance during interactions with a customer by generating a repeatability metric based on statements in an associated interaction transcript. The repeatability metric is a performance indicator that quantifies the amount of repetition an individual experiences or utilizes during an interaction between the agent and the customer. The repeatability metric may be calculated by analyzing a transcript and the associated metadata to identify repetitive statements within the transcript. Once a repeatability metric is calculated it may be aggregated across a plurality of levels within a contact center and within the wider enterprise context to improve customer-agent interactions. Thus, the insights provided by the repeatability metric may highlight areas where additional agent training is required, improve agent response time, and increase customer satisfaction with their contact center experience.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
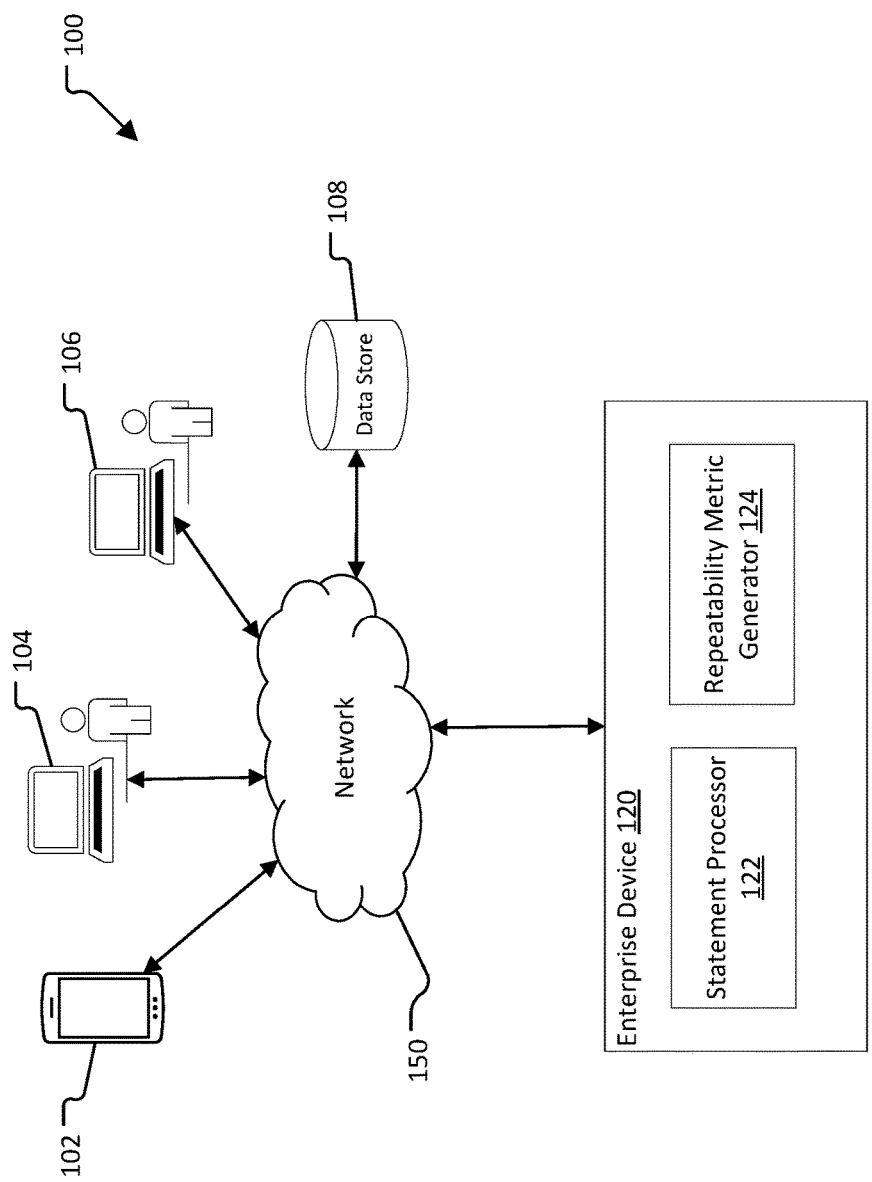
FIG. 1 is a diagram illustrating a system for analyzing a customer agent interaction using a repeatability metric, according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Contact centers manage omnichannel customer interaction. Some channels managed by a contact center may include telephone (e.g., VOIP call), email, text, chat, and website interface services in which an agent interacts with the customer as well as other communication methods. In a typical scenario a customer may contact an agent regarding a particular issue. Alternatively, an agent may contact a customer regarding a particular issue. The agent and customer may interact with predetermined disclosure and issue determining question sets then transition into a professional conversational interaction as the agent identifies the issue and responds to the customer's needs. In the ideal situation the agent will respond to the customers' needs, reach a successful conclusion, and proceed to the next customer. However, in many instances resolving customer issues is not a straight-forward task due to a variety of factors, some of which are agent related and some which are external to the agent. Often in the non-ideal scenario repetitive cycles of words or phrases occur which indicate a communication breakdown between the agent and customer. Understanding the communication breakdown evidenced by this repetition is an important part of evaluating and improving agent performance.

To assist in the evaluation and training process the interactions between an agent and the customer are often recorded and stored for later use as transcripts. Each day many transcripts are generated due to the omnichannel nature of contact centers and the high volume of customers contacting the center. The transcripts are textual representations of the interaction between the agent and customer and may include transcripts of a conversation had over the phone or through a virtual communication system (e.g., video calling), chat history, email traffic, etc. The transcript may be utilized by contact center supervisors to understand how well agents interact with the customers, evaluate agent performance, standardize training methods, and improve the overall quality of the contact center.

However, in many cases supervisors must manually review multiple transcripts across several customer interactions to generate performance metrics for an agent. The manual review process can be time-consuming for the supervisor and limited in the amount of data which can be reviewed and processed. As a result, the manual review process may not produce a true representation of customer-agent interactions or agent performance across multiple customers. Another issue with the manual review process is that repetition could be caused by a variety of situations and factors. For example, a bad connection could lead to constant repeating of words or phrases by the agent and/or the customer as they attempt to communicate. Alternatively, an agent may have trouble explaining themselves to the customer and may need to repeat themselves several times, which degrades the quality of the interaction. In a third scenario, a customer may be constantly repeating themselves to the agent which may indicate the agent is not listening or not understanding the customer. Each of the above examples might occur only a few times if at all during the dozens or hundreds of calls that an agent participates in on a daily basis. As a result, the volume of calls which need to be reviewed is so large that a human reviewer might miss the calls where repetition, hardware, and/or other poor performance issues occurred or not review them at all. Thus, the volume of call transcripts which need to be reviewed by a human is a limiting factor in improving contact center performance.

Some contact centers have attempted to overcome this deficiency be employing repetition related phrase lists which function as keyword spotters to detect effective and ineffective communication and repetition during an interaction. In such a scenario, transcripts may be compared to the phrase lists and evaluation metrics determined. However, the phrase list approach does not optimize transcript analysis because the phrase list must be manually created and curated to remain relevant, the comparison does not consider semantic context, and the resulting evaluation metrics are limited to the phrases on the list. The result is that certain types of repetition may not be accounted for depending on the thoroughness of the phrases included in the list.

As discussed in more detail below, the present disclosure relates to generating a repeatability metric based on a transcript. The repeatability metric is a performance metric that quantifies the amount of repetition an individual, or individuals, experiences or utilizes during an interaction. The repeatability metric may be considered from the perspective of the person(s) experiencing the repetition or from the perspective of the person(s) utilizing the repetition. The repeatability metric for the person(s) experiencing repetition is repeatability measured from the text of the other individual(s) on the call. The repeatability metric for the person (s) utilizing repetition is repeatability measured from that person's words during the course of the interaction. In aspects described below, a repeatability metric is calculated based on a variety of methods which analyze the relationship between statements within a transcript. In some embodiments, statements may be pre-processed to assist in the calculation process.

Once the repeatability metric is calculated, transcripts and/or statements with a high repeatability metric may be categorized to group similar statements to identify scenarios where additional training or further review is required. Alternatively, one or more statements could be grouped by repetition where the repetition of the same or similar series of statements in the transcript might be indicative of an issue the supervisor could address. For example, on one call an agent might have to repeat the instructions on how to login to a website. On another call, the agent might have to repeat instructions on how the caller can reset their password. An analysis of all calls may identify these and similar calls as having a high repeatability metric. Once the repeatability metric is calculated, these calls and similar calls may be grouped into a group called "Website issues." Knowing that repetition is constant for calls in this particular group may indicate that a human supervisor should take a corrective action to address the repetition, such as manually reviewing and rewriting the instructions agents are directed to give.

Additionally, the statements and associated repeatability metrics may be aggregated at a variety of levels such as the agent, team, and queue level among others, as well measured over a certain time period. Once aggregated the repeatability metrics can be utilized as a comparison metric across like dimensions by utilizing assigned weights and optimization values generalized to provide insight in the evaluation process.

There are several benefits to generating and utilizing a repeatability metric in this manner over prior solutions. First, it enables more of the transcript to be utilized in the evaluation process than through manual review by a supervisor. Second, it is more likely that a repetition cycle will be recognized and recorded by the system regardless of the content of the statements because phrase lists are not employed to determine repetition. Third, aggregation across a variety of levels provides more robust insights into areas of strength at the contact center as well as areas for improvement without requiring the supervisor to manually review one or more transcripts at each level. Finally, by basing the repeatability metric off the relationship between statements it is easier for the supervisor to identify contextual situations which are likely to produce a high repeatability metric and train agents to recognize them as well. Ultimately, determining and analyzing customer agent interactions based on the repeatability metric results in greater customer satisfaction with contact center agents. While specific benefits have been described herein, one of skill in the art will appreciate that other benefits are provided by the aspects disclosed herein.

FIG. 1 is a diagram illustrating a system for analyzing a customer agent interaction using a repeatability metric, according to aspects described herein. A system 100 may include a customer device 102, an agent device 104, a supervisor device 106, a data store 108, and an enterprise device 120 which communicate over a network 150. The enterprise device may include a statement processor 122, and a repeatability metric generator 124. The network 150 may comprise one or more networks such as local area networks (LANs), wide area networks (WANs), enterprise networks, the Internet, etc. and may include one or more of wired, wireless, and/or optical portions. It should be appreciated that while multiple agents and supervisors each utilizing an agent device 104 or supervisor device 106 may each work at a contact center, they do not need to be geographically collocated, but rather may be geographically dispersed but connected via network 150.

In aspects, the customer device 102, agent device 104, and supervisor device 106 may be any device that can receive, process, modify, and communicate content on the network 150. Examples of a customer device 102, agent device 104, and supervisor device 106 include a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer), telephone, mobile device, and/or a wireless device where a customer, contact center agent, and/or contact center supervisor may interact with each other. Customer device 102, agent device 104, and supervisor device 106 may be configured to execute one or more software applications (or "applications") and/or services and/or manage hardware resources (e.g., processors, memory, etc.), which may be utilized by users of the customer device 102, agent device 104, and supervisor device 106.

The customer device 102, agent device 104, and supervisor device 106 may include an application (not pictured) which displays content for use on the customer device 102, agent device 104, and supervisor device 106 and for communication across the network 150. The application may be a native application or a web-based application. The application may operate substantially locally to the customer device 102, agent device 104, and supervisor device 106 or may operate according to a server/client paradigm in conjunction with one or more servers (not shown). The application may be used for communication across the network 150 or to view content relating to the repeatability metric. For ease of discussion, the description herein refers to a single customer device 102, a single agent device 104, and a single supervisor device 106. But features and examples of the customer device 102, agent device 104, and supervisor device 106 are applicable to multiple devices. Further, it is contemplated that the agent device 104 and supervisor device 106 are interchangeable within the contact center as both devices are part of the larger contact center enterprise network.

In accordance with some embodiments, the agent device 104, supervisor device 106, and enterprise device 120 may have access to data contained in a data store 108. The data store 108 may contain information related to customer and agent interactions such as transcript data and other content relating to the contact center which may be utilized as described below with regard to the repeatability metric. Data store 108 is a network server, cloud server, network attached storage ("NAS") device, or another suitable computing device. Data store 108 may include one or more of any type of storage mechanism, including a magnetic disc (e.g., in a hard disk drive), an optical disc (e.g., in an optical disk drive), a magnetic tape (e.g., in a tape drive), a memory device such as a random-access memory (RAM) device, a read-only memory (ROM) device, etc., and/or any other suitable type of storage medium. Although only one instance of the data store 108 is shown in FIG. 1, the system 100 may include two, three, or more similar instances of the data store 108. Moreover, the network 150 may provide access to other data stores, similar to data store 108 that are located outside of the system 100, in some embodiments.

Enterprise device 120 may include one or more server devices, distributed computing platforms, cloud platform devices, processors, and/or other computing devices such as the statement processor 122, and a repeatability metric generator 124. Enterprise device 120, statement processor 122, and repeatability metric generator 124 communicate with data store 108, customer device 102, agent device 104, and supervisor device 106 via network 150.

In a typical use scenario, a customer may contact the contact center on customer device 102 and may be assisted by an agent on the agent device 104. The interaction between the customer and agent may occur as a voice chat where the customer and agent are talking to each other, as a text chat in a chat window with an instant messaging function, as a combination of both voice and text, as a video teleconference where the agent and customer may see each other, and/or by some other means where the agent and customer may interact with each other over the network 150. In some instances, the agent's supervisor may be involved in the customer agent interaction either directly (e.g., speaking directly to the customer based on their request or for training purposes) or indirectly (e.g., to monitoring the interaction).

The interaction between the agent and customer may be recorded as a transcript which includes the spoken and written interaction labeled for each individual communicating along with a time stamp. The transcript may be stored on data store 108. In some embodiments, each instance of a customer and agent interaction over the course of an agent's shift may be recorded and the transcripts stored on the data store 108. Additionally, each customer agent interaction for each agent at the contact center may be recorded as a transcript and stored on data store 108. The metadata for each transcript may also be stored on the data store 108. Each transcript may be utilized individually or in combination by a supervisor on the supervisor device 106 to evaluate individual agents within a contact center, agent teams at the contact center, or improve training programs at the agent or contact center level. A repeatability metric may be utilized to conduct these evaluations.

The enterprise device 120 may contain a statement processor 122 and a repeatability metric generator 124 which can be utilized to generate a repeatability metric. The statement processor 122 receives the one or more transcripts and associated metadata from the data store 108. Initially, the statement processor 122 analyzes the transcripts to identify one or more statements within the transcript. A statement is an expression of something in speech or text from an individual in the transcript which may occur as an utterance, sentence, or any other segment of speech or text of varying length. The statement does not need to be a complete sentence or thought. Abrupt verbal expressions, one person interrupting the other, slang and other colloquialisms may be considered statements. As such, the statement processor 122 may be designed to identify statements of varying dimensions such as length of the statement and connectivity between utterances within the transcript. The statement processor 122 may utilize natural language processing or other machine learning methods to identify statements from a transcript. The statements remain connected to the transcript where the transcript is the source document for the identified statements.

In some embodiments, the statement processor 122 may also be configured to perform optional pre-processing of the statements to prepare them for the repeatability metric generator 124. In some instances, this may involve sanitizing or anonymizing some or all of the statements identified in a transcript to protect the privacy of the customer. For example, if sensitive personal information is included in the transcript those statements may be sanitized to conceal or remove the personal information. In some embodiments, the length of statements that the statement processor 122 identifies can be varied by the system or the user as a preference. The varying length may be as short as a single word or keyword to a longer length to capture more context within the identified statement. In some embodiments, the statement processor 122 may analyze the transcript and/or statements to identify and include only meaningful words in the output while filtering out common words that convey less meaning. A meaningful word is a word that denotes valuable information within the statement. A common word is a word like a filler word that does not denote valuable information within the statement and often exists as a preposition or phrase to connect meaningful words within a statement.

For example, the transcript may include the customer call "I need help with my auto insurance please." followed by the agent response "I'm happy to help you with that, what aspect of your auto insurance do you need help with today?" From this customer agent interaction, the statement processor 122 may identify two statements first the customer introduction and second the agent response. In this instance, the statement processor 122 may be designed to filter out common words and include meaningful words such that the two statements would be "help my auto insurance" and "happy help aspect your auto insurance" or some variation thereof based on the filtering method of the statement processor 122. Alternatively, rather than two statements, one each from the customer and agent, the statement processor 122 could be designed to identify statements of longer length where one statement includes both the call and response. In this case the single statement would be "I need help with my auto insurance please. I'm happy to help you with that, what aspect of your auto insurance do you need help with today?" In instances where filtering was applied the single statement might be "help my auto insurance happy help aspect your auto insurance" or some variation thereof. It will be appreciated by one having skill in the art that there are a multitude of methods for designing the statement processor 122 to select a statement length and filter transcripts and statements into meaningful and common words, each of which could be applied in this case. In other embodiments, the statement processor 122 may be designed to either filter out some or all punctuation in the statements that does not convey meaning such as commas or periods. Alternatively, the statement processor 122 may identify certain punctuation that may be indicative of repetition such as question marks or exclamation points among other punctuation types selected during the system design process.

Once the statements are identified the repeatability metric generator 124 calculates a repeatability metric value for the transcript based on the statements and metadata within the transcript using machine learning algorithms or other statistical techniques. The repeatability metric and methods described below can be applied to the statements in the transcript in both a linear manner and/or tree-based manner to determine the repeatability metric for the transcript. If applied in a linear manner than the statements are evaluated as pairs in order such that statement A to statement B, then statement B to statement C, then statement C to statement D and so on. Alternatively, in the tree-based method the statements can be compared in a plurality of orders such as statement A to statement B, then statement A to statement C, then statement A to statement D, then statement B to statement C, then statement B to statement D, and so on. Additionally, the repeatability metric generator 124 can recognize a variety of phrases that have a similar semantic context and identify them in the statements to output a more accurate repeatability metric. For example, the phrase "I don't understand" may be semantically related to "can you speak more slowly," "this is difficult to keep track of," and "I'm confused" among a plurality of other similar phrases. Each of these phrases and their semantically related counterparts may be utilized to generate the repeatability metric. In some embodiments, a threshold value may be applied by the repeatability metric generator 124 such that the total repetitive statements within a transcript and/or the type of repetition across statements would need to exceed the threshold to calculate a repeatability metric.

The repeatability metric may be calculated by the repeatability metric generator 124 using a variety of different methods. One method may be to utilize a comparison metric between aspects of the statement (e.g., word by word comparison or character by character comparison) which could be performed as a bag of words comparison or linear comparison (e.g., words in order). Another method may be to calculate a Levenshtein distance as a string metric measuring distance between two sequences where the sequences could be defined independently by the evaluator for the repeatability metric generator 124. Another method may be an absolute word difference comparison between the words in a transcript or the words in a statement. Alternatively, a synonym comparison could be performed between statements. In another method the repeatability metric generator 124 may search for explicit repeatability indicators within the statement as evidence of repetition. An explicit repeatability indicator is a direct indication either spoken or written that a participant within the interaction is confused or needs one of the other parties to repeat or restate something. Examples of explicit repeatability indicators include "could you repeat that," "I don't understand," "I'm confused," "this doesn't make sense to me," "help me understand this better," "why is this the way it is" and other similar words or phrases. Another method to calculate the repeatability metric could be analyzing contextual meaning between statements by creating embeddings for words within a statement and applying cosine similarity or one of many machine learning methods to identify repetition. Another method may be to utilize a machine learning algorithm to perform a nearest neighbor search of the statements in a transcript. An additional method may be to use word transformation techniques like stemming and/or lemming prior to comparison between statements to increase the contextual variants the algorithm identifies within the repeatability metric. One having skill in the art will appreciate that these methods may be applied singularly or in combination with each other to generate the repeatability metric. The repeatability metric generator 124 outputs the repeatability metric which is a value that represents the repetition between pairs of statements within the transcript. Additionally, the repeatability metric generator 124 may aggregate multiple statements within a transcript and/or the entire transcript itself to produce one or more repeatability metrics as well.

In some embodiments, the repeatability metric generator 124 may also receive one or more transcripts with associated statements and calculate a repeatability metric across the one or more transcripts. This may provide the additional benefit of understanding repetition for the agent across multiple customers or alternatively for a single individual across multiple agents and/or supervisors within a contact center. For example, if an agent was having difficulty responding to a customer's query and the customer was transferred to a different agent or supervisor which might result in multiple transcripts being generated. Calculating repeatability across the multiple interactions and transcripts for the same customer would be useful in understanding and evaluating the entire interaction.

Once the repeatability metric has been generated by the repeatability metric generator 124, it aggregates the repeatability metric output to identify insights into why certain transcripts have a higher or lower metric. The aggregation methods can be used in the evaluation process to improve agent performance and compare across like dimensions. A like dimension is any common comparison point from which aggregation of one or more repeatability metrics can occur. For example, a like dimension can be at the agent level such as the individual agent up to the team, contact center, or queue level. Additionally, a like dimension can be a varying amount of time (e.g., shift, day, week, month, etc.) and/or threshold values (e.g., number of customers assisted, total transcripts that exceed a certain repeatability threshold level for an agent or team, number of recurring repetitions within the same transcript, etc.). Like dimensions could also be taken from either the experience or utilization level. In these instances, the dimension is a measure of experience of repeatability or utilization of repeatability aggregated over time in a transcript or across multiple transcripts from the perspective of either the agent or the customer. The repeatability metric could also be aggregated based on where the repetition occurred within the call (e.g., beginning of call versus the end of the call), all customer interactions for an agent, team, etc. Thus, aggregation across like dimensions can occur at a plurality of levels and thresholds to allow for a diverse view and comparison amongst like dimensions to evaluate agent performance, training effectiveness and other A/B test comparisons. Some of the multitude of aggregation methods which could be employed by the repeatability metric generator 124 will be described as non-limiting examples herein.

In some embodiments, the repeatability metric generator 124 can compare the repeatability metrics of one agent to another or at a larger level of a team to another or a contact center to another. In other embodiments, an associated optimal value that is not zero could be extracted by the repeatability metric generator 124 from a large enough data set to be generalized to an industry, customer query type, agent type, etc. The optimal value could then be distributed as a functional value for comparison or as a recommended standard across an industry to compare one company to another.

In some embodiments, once the repeatability metric is calculated it may be categorized by the repeatability metric generator 124 to group similar statements for ease of analysis. For example, categorization could occur by the type of statement like a question statement (e.g., "Can you repeat that?" or "Why do I have to submit this document?") or lack of understanding statements (e.g., "I don't understand." or "This is confusing.") among other statement types. Alternatively, one or more statements could be categorized by repetition where the repetition of the same or similar series of statements in the transcript might be indicative of an issue the supervisor could address. For example, a series of statements where the customer says first "What does this letter mean?" followed by agent response, then customer says "But why does it mean that?" followed by similar agent response, then customer stating "Can you say that again?" followed by a similar agent response, then the customer stating "I'm confused." may be indicative of repetition that can be categorized to highlight the exchange for further review. Additionally, one or more statements could be categorized based on repetition of a similar statement made by multiple different callers across multiple calls. The similar statements may be made either with the same agent across multiple calls and/or with multiple agents across multiple calls. For example, on call 1 may have a high repeatability score due to customer 1 needing help with a password reset issue because the customer repeatedly asks the agent to clarify the password reset instructions. Similarly, call 2 may have a high repeatability score, also for password reset because the customer asks the agent to repeat a step of the instructions that was missed. Over time there may be multiple other instances on different calls that each have a high repeatability score due to a password reset issue. The repeatability metric generator 124 may take the high repeatability statements from each call with the high repeatability score and cluster them based on the issue causing a high repeatability score, in this case password reset. If the repeatability metric generator 124 identifies a common issue, such as password reset, occurring in a large number of calls that may be indicative of a systemic issue that can be addressed by contact center supervisor. In this case, it may mean that the agent instructions for password reset issues needs to be reworked.

In other embodiments, threshold values could be defined and applied by the repeatability metric generator 124 during the aggregation process. For example, the threshold value could be that all agents in a contact center need to have a monthly repeatability metric for all customers under 50% or other similar metrics. These threshold values could be utilized by the repeatability metric generator 124 to compare agent performance to the threshold where agents exceeding the threshold value may require additional training to improve performance. Additionally, the threshold value could be utilized to filter call transcripts such that a transcript would need to have a repeatability metric above a certain threshold value before it would be considered for aggregation or highlighted for review by the repeatability metric generator 124.

In another embodiment, the repeatability metric could be weighted using various methods to filter out less important repetition while highlighting repetition that is more useful in the evaluation process. In this instance, the weighting might be a multiplier used by the repeatability metric generator 124 when a certain event occurs within the statements of a transcript. For example, in a transcript with a plurality of statements that achieves a high repeatability metric, rather than merely flagging it the repeatability metric generator 124 could apply an algorithm where more weight is given to high value repetition such as three or more repetitive statements in a row and less value is given to single repetitive statements interspersed throughout the call. In this example, it is possible that a transcript with an overall high repeatability metric based on fifty individual repetitive statements would end up with a lower aggregated repeatability metric than another transcript with only fifteen repetitive statements because the fifteen statements are in a row. The weighting metric could be customized at various levels by the repeatability metric generator 124 for example by industry, by distance weighting (e.g., if there were two points of repetition that were multiple minutes apart in a twenty call this could be less important than 4 points of repetition in a five minute call), as a weighted average where the repeatability metric is aggregated over each statement in the transcript to produce the average repeatability for the entire interaction, topic weighting (e.g., phrases like "I can't hear you," "we have a bad connection," or "what is your name/contact information again" have a lower weight while phrases like "that doesn't make sense" or "explain that again" have more weight), keyword weighting, location within the transcript (e.g., repetition at the beginning of a transcript is less important than elsewhere in the transcript where the customer or agent is explaining the problem or solution), among a plurality of other weighting types.

Like dimensions could be a direct comparison such as agent to agent, contact center to contact center, etc. or an indirect comparison where the dimension is compared to a corporate standard or threshold value. In these instances, the repeatability metric generator 124 identifies various associations between the one or more repeatability metrics from the one or more transcripts which can be useful to the supervisor. The repeatability metric can be aggregated at a plurality of dimensions such as the individual agent, team, contact center, and queue level to understand how repetition is affecting customer agent interactions. For example, the repeatability metric generator 124 could take all the transcripts and repeatability metrics for each agent within a team and create an overall repeatability metric for the team. Alternatively, the repeatability metric generator 124 could aggregate the repeatability metrics at the contact center level so different contact centers could be compared with each other. Additionally, the repeatability metric generator 124 can measure repeatability metric aggregation over varying lengths of time such as a shift, a day, a week, a month, and/or longer. The output of the repeatability metric generator 124 may be a report or document that includes the repeatability metric and/or the values for the selected aggregation methods which may be stored on data store 108.

As will be appreciated, the various methods, devices, apps, nodes, features, etc., described with respect to FIG. 1 or any of the figures described herein, are not intended to limit the system to being performed by the particular apps and features described. Accordingly, additional configurations may be used to practice the methods and systems herein and/or features and apps described may be excluded without departing from the methods and systems disclosed herein.

Figure 2:
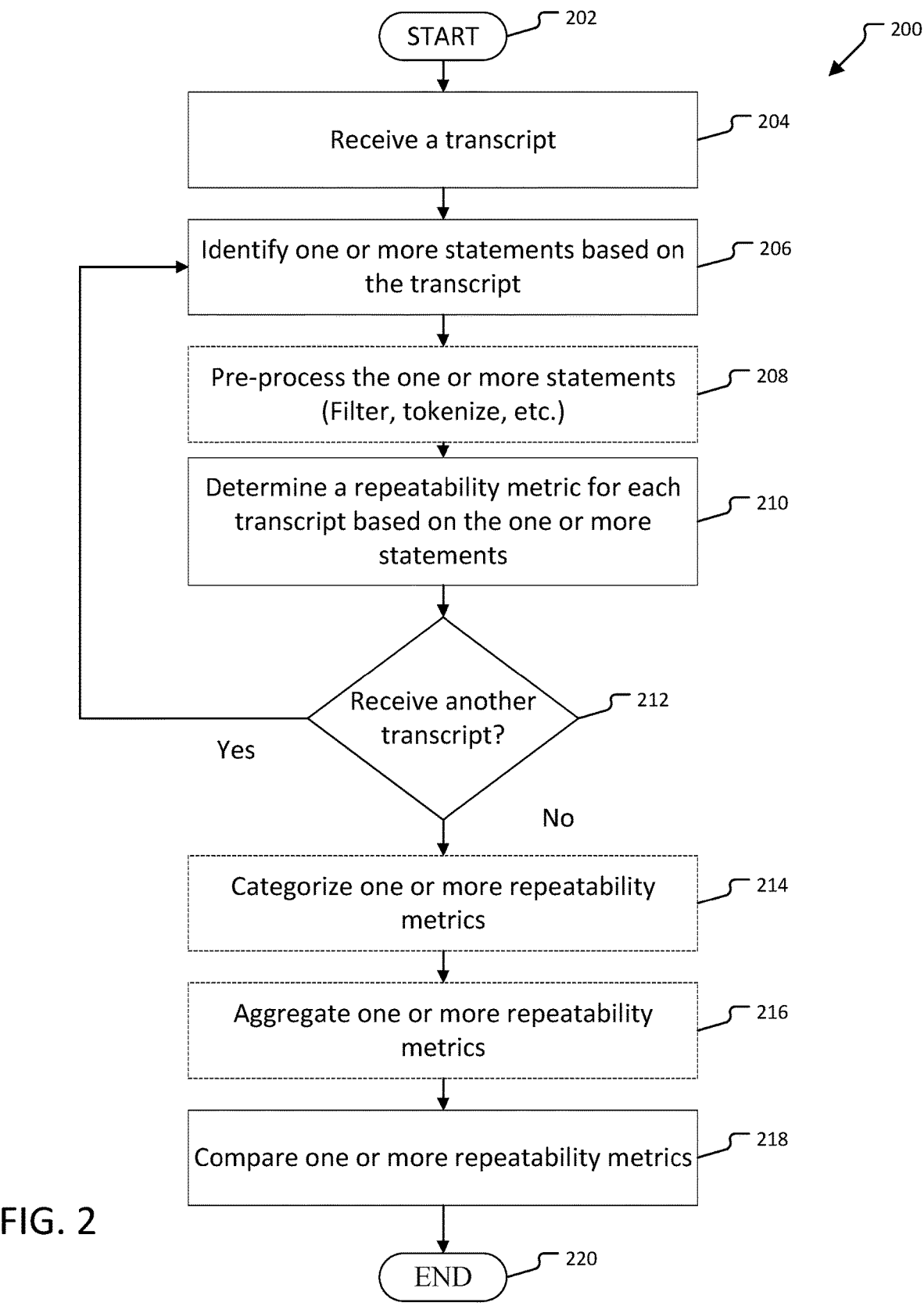
FIG. 2 is a block diagram illustrating a method for analyzing a customer agent interaction using a repeatability metric, according to aspects described herein.

FIG. 2 is a block diagram illustrating a method for analyzing a customer agent interaction using a repeatability metric, according to aspects described herein. A general order of the operations for the method 200 is shown in FIG. 2. Generally, the method 200 begins with start operation 202 and ends with end operation 220. The method 200 may include more or fewer steps or may arrange the order of the steps differently than those shown in FIG. 2. The method 200 can be executed as computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4, and 5.

Following the start operation 202, the method 200 begins with receive operation 204, where a statement processor (e.g., statement processor 122) receives one or more transcripts from a data store (e.g., data store 108). The transcript may be a record of an interaction between a customer and agent at a contact center. The transcript may be a record of a voice conversation, video call, chat between the agent and customer on an online messaging portal, and/or any combination thereof.

Flow progresses to identify operation 206, where a statement processor (e.g., statement processor 122) identifies statements within the transcript. The statement processor analyzes the transcript to identify one or more statements within the document and connect the statements to a speaker. The statement processor can identify statements by dimensions of varying length and connectivity between the customer and agent. For example, the statement processor could be designed to identify a statement as a single sentence spoken by a speaker such as the customer call "I'm having trouble hearing you" with the next statement being the response from the agent "Can you hear me better now." Alternatively, the statement processor could be designed to identify the customer call and agent response as a single statement. In some embodiments, the statement processor may identify statements of longer or shorter lengths than the recited example, based on system design choices.

Flow progresses to optional pre-process operation 208, where a statement processor (e.g., statement processor 122) may optionally pre-process the one or more statements prior to determining a repeatability metric. In some instances, the statement processor may filter out words, phrases, and/or punctuation that is not meaningful to repetition to assist in generating more accurate repeatability metrics. In other instances, the statement processor may sanitize or anonymize certain statements within the transcript to protect customer privacy and personal information.

Flow progresses to determine operation 210, where a repeatability metric generator (e.g., repeatability metric generator 124) determines a repeatability metric for the transcript based on the one or more statements. The repeatability metric may be calculated using a variety of methods to determine the amount of repetition that exists in the statements of the transcript.

Flow progresses to decision operation 212, where it is determined if another transcript is received that needs to be processed by a repeatability metric generator (e.g., repeatability metric generator 124). If another transcript is received for processing flow progresses to identify operation 206, where the subsequent transcript(s) are processed. If no additional transcripts are received for processing flow progresses to categorize operation 214, where the repeatability metric and one or more statements may be optionally categorized by the repeatability metric generator. At this optional step, the repeatability metric generator may in cases where a transcript has a high repeatability metric, analyze and categorize statements and/or a series of statements which may have caused the repeatability metric to be higher. This may identify repetition across multiple statements between the agent and customer that are direct repetition and/or indirect repetition. Direct repetition may be repetition of the same or similar phrases by the speaker consecutively. Indirect repetition may be where the flow of the interaction does not progress because the same topic or contextual topic is continually discussed or is brought up multiple times throughout the interaction. An example of indirect repetition may be where the customer asks for a topic to be explained in the call, the agent answers and both parties move on with the interaction, only to have the customer ask the same or similar question about the topic again. Aspects of machine learning may be utilized to identify and categorize the one or more statements. Additionally, if multiple transcripts have been processed by the repeatability metric generator, then categorization of the statements identified by high repeatability metrics across calls may occur to identify common issues that could be addressed.

Flow progresses to aggregate operation 216, where the repeatability metric may optionally be aggregated by a repeatability metric generator (e.g., repeatability metric generator 124). Aggregation may be performed to prepare the one or more repeatability metrics and/or the one or more statements for comparison across like dimensions. Based on the design choices of the system, the repeatability metric may be aggregated across a variety of dimensions to assist with comparison and identification of repetition as areas for evaluation and improvement. Aggregation could be focused on one or more of agents, teams of agents, locations of repetition of statements within the transcript, identification of metrics that are common thresholds utilized for understanding repetition, among a plurality of other aggregation options.

Flow progresses to compare operation 218, where the one or more repeatability metrics are compared based on repeatability metric by a repeatability metric generator (e.g., repeatability metric generator 124). The comparison may be conducted across like dimensions for the one or more statements within a single transcript or more broadly to compare the one or more statements and/or one or more repeatability metrics for each transcript to each other. The comparison may be made against threshold or other optimum values generalized for the contact center and/or industry to provide context on performance of the agent within the contact center or more broadly across the enterprise environment. The method ends with end operation 220.

Figure 3:
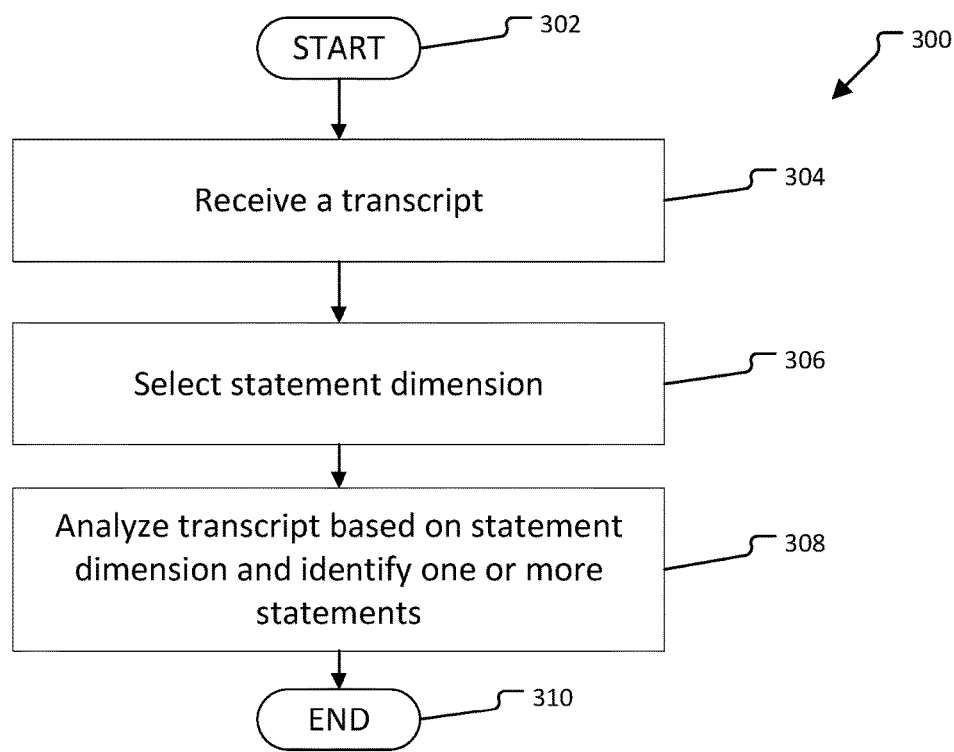
FIG. 3 is a block diagram illustrating a method for identifying one or more statements based on a transcript, according to aspects described herein.

FIG. 3 is a block diagram illustrating a method for identifying one or more statements based on a transcript, according to aspects described herein. A general order of the operations for the method 300 is shown in FIG. 3. Generally, the method 300 begins with start operation 302 and ends with end operation 310. The method 300 may include more or fewer steps or may arrange the order of the steps differently than those shown in FIG. 3. The method 300 can be executed as computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 4, and 5.

Following the start operation 302, the method 300 begins with receive operation 304, where a statement processor (e.g., statement processor 122) receives one or more transcripts from a data store (e.g., data store 108). The transcript may be a record of an interaction between a customer and agent at a contact center. The transcript may be a record of a voice conversation, video call, chat between the agent and customer on an online messaging portal, and/or any combination thereof.

Flow progresses to select operation 306, where the dimension for the statement is selected for use by the statement processor (e.g., statement processor 122) to apply. The statement dimension could be a varying length or connectivity between utterances within the transcript based on system design choice. For example, the statement processor could be designed to identify a statement as a single sentence spoken by a speaker such as the customer call "I'm having trouble hearing you" with the next statement being the response from the agent "Can you hear me better now." Alternatively, the statement processor could be designed to identify the customer call and agent response as a single statement. In some embodiments, the statement processor may identify statements of longer or shorter lengths than the recited example, based on system design choices Flow progresses to analyze operation 308, where the transcript is analyzed based on selected statement dimension by a statement processor (e.g., statement processor 122). Machine learning aspects or natural language processing may be utilized by the statement processor to analyze and identify the one or more statements from the transcript. The method ends with end operation 310.

Figure 4:
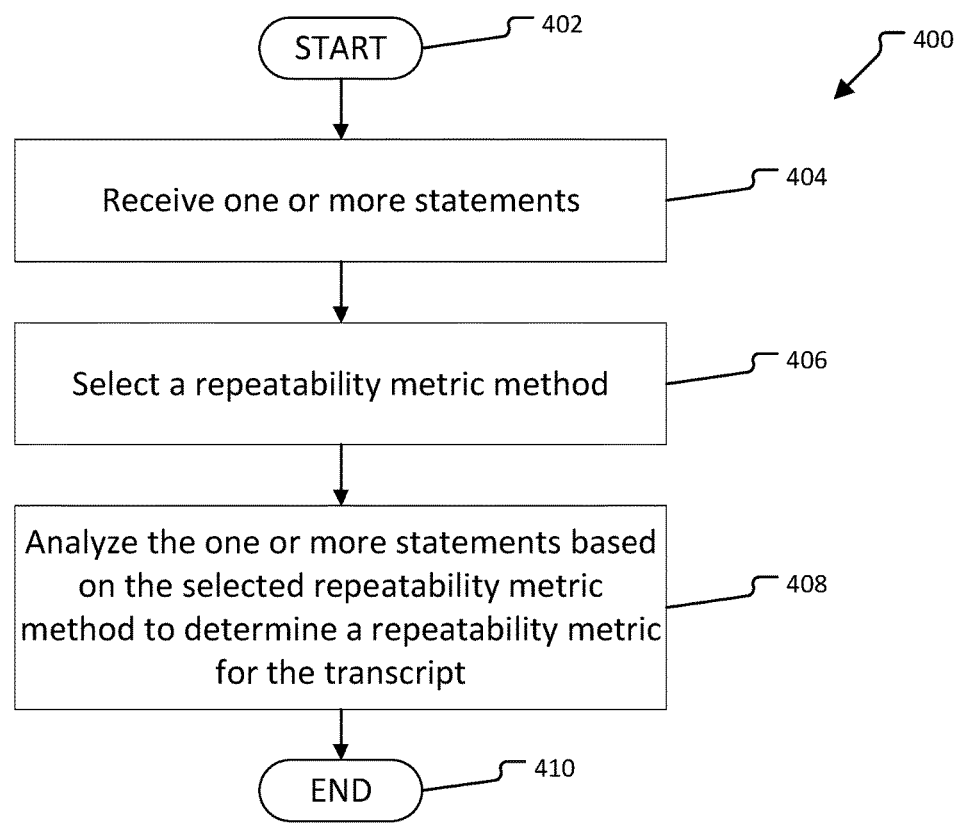
FIG. 4 is a block diagram illustrating a method for determining a repeatability metric, according to aspects described herein.

FIG. 4 is a block diagram illustrating a method for determining a repeatability metric, according to aspects described herein. A general order of the operations for the method 400 is shown in FIG. 4. Generally, the method 400 begins with start operation 402 and ends with end operation 410. The method 400 may include more or fewer steps or may arrange the order of the steps differently than those shown in FIG. 4. The method 400 can be executed as computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, 3, and 5.

Following the start operation 402, the method 400 begins with receive operation 404 where a repeatability metric generator (e.g., repeatability metric generator 124) receives one or more statements in a transcript from a statement processor (e.g., statement processor 122). The repeatability metric generator may receive the one or more statements that optionally have been pre-processed by the statement processor.

Flow progresses to select operation 406, where a repeatability metric method is selected for a repeatability metric generator (e.g., repeatability metric generator 124). The repeatability scoring method could be a plurality of different scoring methods applied singularly or in combination including but not limited to a word by word or character by character comparison between statements such as a Levenshtein distance, bag of words comparison, linear comparison, synonym comparisons between statements, search through the statements for explicit repeatability indicators, contextual meaning analysis utilizing embeddings of words within a statement and/or statements themselves with associated algorithms such as cosine similarity, and/or word transformation techniques such as stemming or lemming prior to comparing statements.

Flow progresses to analyze operation 408, where the one or more statements are analyzed by a repeatability metric generator (e.g., repeatability metric generator 124) to determine a repeatability metric. Once the repeatability metric method is selected, machine learning algorithms or other techniques may be applied to the one or more statements to determine a repeatability metric. The method ends with end operation 410.

Figure 5:
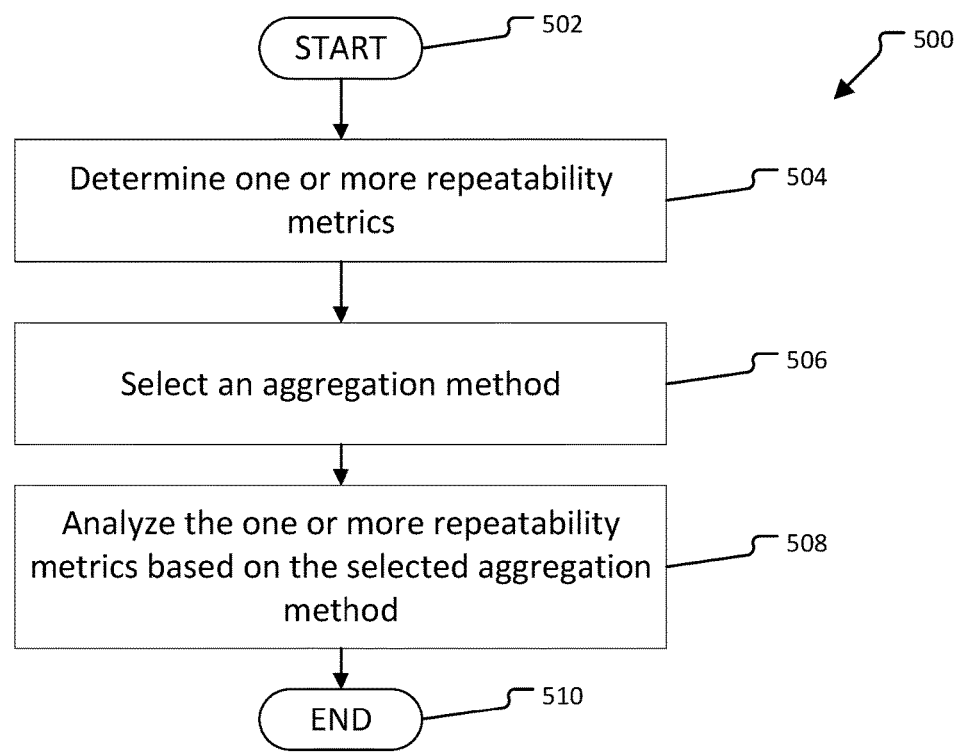
FIG. 5 is a block diagram illustrating a method for aggregating one or more repeatability metrics, according to aspects described herein.

FIG. 5 is a block diagram illustrating a method for aggregating one or more repeatability metrics, according to aspects described herein. A general order of the operations for the method 500 is shown in FIG. 5. Generally, the method 500 begins with start operation 502 and ends with end operation 510. The method 500 may include more or fewer steps or may arrange the order of the steps differently than those shown in FIG. 5. The method 500 can be executed as computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, and 4.

Following the start operation 502, the method 500 begins with determine operation 504, where one or more repeatability metrics are determined by a repeatability metric generator (e.g., repeatability metric generator 124). Based on the method of evaluation and level of comparison that is intended, the repeatability metric generator may calculate multiple repeatability metrics for each of the multiple transcripts so that the metrics can be compared subsequently. In other embodiments, only a single repeatability metric may be determined for the one transcript being analyzed. The repeatability metric generator can apply the selected method(s) to the statements in the transcript in a linear manner and/or a tree-based manner to determine the repeatability metric for the transcript. Examples of the repeatability metric method(s) which can be applied are a word-by-word comparison between statements, character by character comparison between statements, a Levenshtein distance, bag of words comparison, linear comparison, synonym comparison between statements, search for explicit repeatability indicators, contextual meaning analysis utilizing embeddings and/or other similar methods.

Flow progresses to select operation 506, where an aggregation method is selected for a repeatability metric generator (e.g., repeatability metric generator 124) to utilize. The aggregation methods which could be selected are numerous and are based off identifying like dimensions which can be compared across the one or more repeatability scores, as described above.

Flow progresses to analyze operation 508, where a repeatability metric generator (e.g., repeatability metric generator 124) analyzes the one or more repeatability metrics based on the selected aggregation method. The analysis may focus on the like dimension and compare it against other transcripts, threshold levels, and/or optimum values to compare agent performance and evaluate training effectiveness among other analysis points. The method ends with end operation 510.

Figure 6:
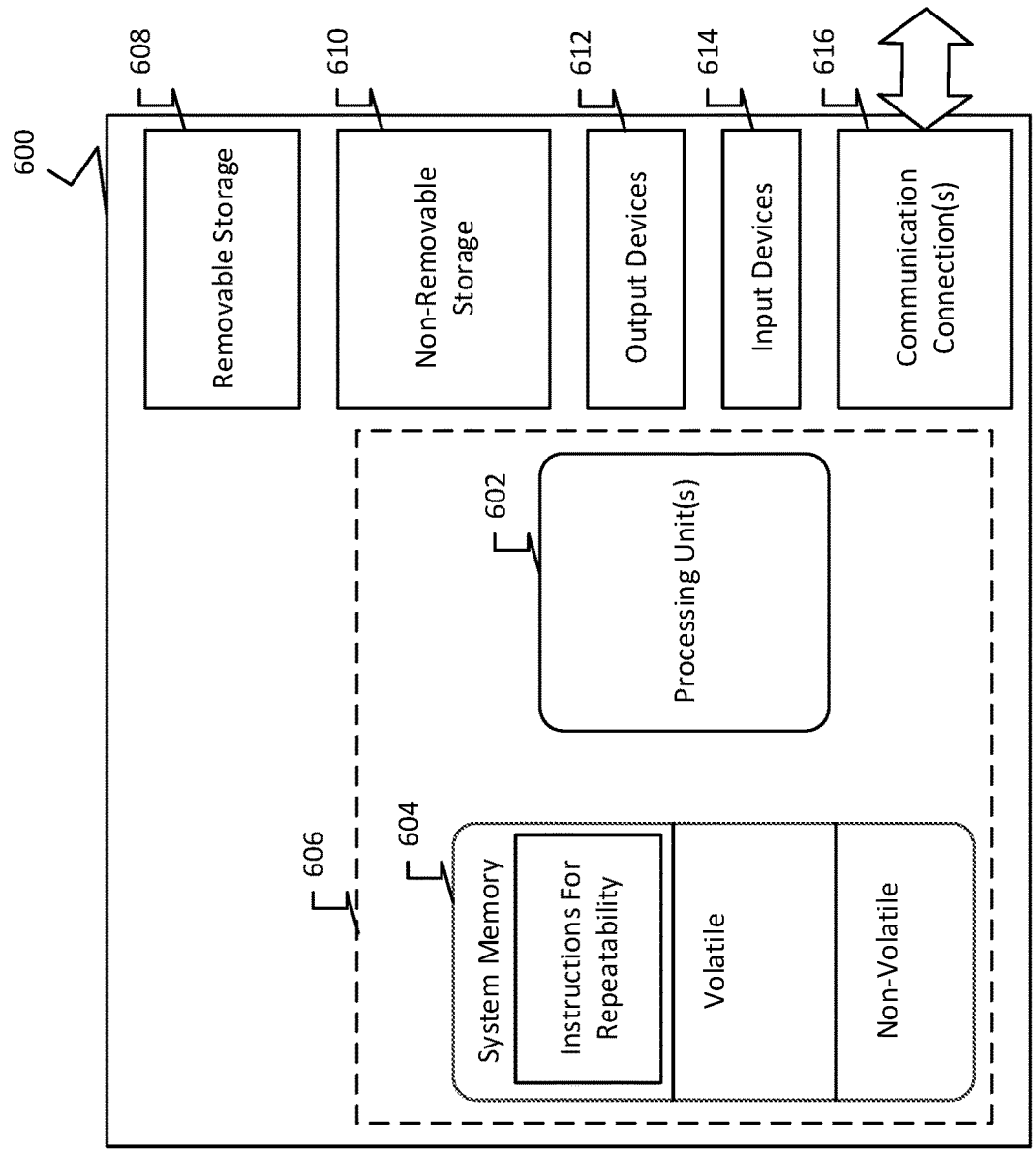
FIG. 6 illustrates a simplified block diagram of a device with which aspects of the present disclosure may be practiced in accordance with aspects of the present disclosure.

FIG. 6 illustrates a simplified block diagram of a device with which aspects of the present disclosure may be practiced in accordance with aspects of the present disclosure. The device may be a mobile computing device, for example. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (e.g., instructions for call tagging as disclosed herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as remote controller, keyboard, mouse, pen, voice input, on-board sensors, etc. and/or output device(s) 612 such as a display, speakers, printer, motors, etc. Also included in the environment may be one or more communication connections 616, such as LAN, WAN, a near-field communications network, a cellular broadband network, point to point, etc.

Operating environment 600 typically includes at least some form of computer readable media. Computer readable media can be any available media that can be accessed by the at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

According to an embodiment of the present disclosure, a system is disclosed comprising at least one processor, and memory storing instructions that, when executed by the at least one processor, causes the system to perform a set of operations, the set of operations comprising receiving a transcript, identifying one or more statements in the transcript, determining a repeatability metric for each transcript based on the one or more statements, and comparing the one or more repeatability metrics.

In various embodiments of the disclosure, pre-processing the one or more statements.

In various embodiments of the disclosure, categorizing the one or more repeatability metrics.

In various embodiments of the disclosure, aggregating the one or more repeatability metrics.

In various embodiments of the disclosure, wherein identifying the one or more statements further comprises selecting a statement dimension, and analyzing the transcript based on statement dimension.

In various embodiments of the disclosure, wherein determining a repeatability metric further comprises selecting a repeatability metric method, and analyzing the one or more statements based on the selected repeatability scoring method.

In various embodiments of the disclosure, wherein aggregating the one or more statements further comprises selecting an aggregation method, and analyzing the one or more repeatability metrics based on the selected aggregation method.

In various embodiments of the disclosure, wherein a statement comprises an expression of something in speech or text from an individual in the transcript which may occur as an utterance, sentence, or any other segment of speech or text of varying length.

In various embodiments of the disclosure, wherein a repeatability metric comprises a performance metric that quantifies the amount of repetition an individual experiences or utilizes during an interaction.

In various embodiments of the disclosure, wherein a repeatability metric method comprises a word-by-word comparison between statements, character by character comparison between statements, a Levenshtein distance, bag of words comparison, linear comparison, synonym comparison between statements, search for explicit repeatability indicators, or contextual meaning analysis utilizing embeddings.

According to an embodiment of the present disclosure a method is disclosed comprising receiving a transcript, identifying one or more statements in the transcript, determining a repeatability metric for each transcript based on the one or more statements, and comparing the one or more repeatability metrics.

In various embodiments of the disclosure, further comprising pre-processing the one or more statements.

In various embodiments of the disclosure, further comprising categorizing the one or more repeatability metrics.

In various embodiments of the disclosure, aggregating the one or more repeatability metrics.

In various embodiments of the disclosure, wherein identifying the one or more statements further comprises selecting a statement dimension, and analyzing the transcript based on statement dimension.

In various embodiments of the disclosure, wherein determining a repeatability metric further comprises selecting a repeatability metric method, and analyzing the one or more statements based on the selected repeatability scoring method.

In various embodiments of the disclosure, wherein aggregating the one or more statements further comprises selecting an aggregation method, and analyzing the one or more repeatability metrics based on the selected aggregation method.

In various embodiments of the disclosure, wherein a statement comprises an expression of something in speech or text from an individual in the transcript which may occur as an utterance, sentence, or any other segment of speech or text of varying length.

In various embodiments of the disclosure, wherein a repeatability metric comprises a performance metric that quantifies the amount of repetition an individual experiences or utilizes during an interaction.

In various embodiments of the disclosure, wherein a repeatability metric method comprises a word-by-word comparison between statements, character by character comparison between statements, a Levenshtein distance, bag of words comparison, linear comparison, synonym comparison between statements, search for explicit repeatability indicators, or contextual meaning analysis utilizing embeddings.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory storing instructions that, when executed by the at least one processor, causes the system to perform a set of operations, the set of operations comprising:
        receiving a plurality of transcripts;
        identifying one or more statements in the plurality of transcripts, wherein identifying the one or more statements comprises:
            determining a plurality of dimensions for analysis, wherein the plurality of dimensions comprises at least one direct comparison and at least one indirect comparison, wherein the indirect comparison is based upon a corporate standard;
        determining two or more repeatability metrics for two or more transcripts of the plurality of transcripts based on the one or more statements and the plurality of dimensions;
        aggregating the two or more repeatability metrics, wherein aggregating the one or more repeatability metrics further comprises:
            selecting an aggregation method based upon a similarity of dimensions across two or more repeatability metrics; and
            analyzing the two or more repeatability metrics based on the selected aggregation method; and
        comparing the two or more repeatability metrics.

2. The system of claim 1, further comprising:
    pre-processing the one or more statements.

3. The system of claim 1, further comprising:
    categorizing the two or more repeatability metrics.

4. The system of claim 1, wherein determining a repeatability metric further comprises:
    selecting a repeatability scoring method; and
    analyzing the one or more statements based on the selected repeatability scoring method.

5. The system of claim 4, wherein a repeatability metric method comprises a word-by-word comparison between statements, character by character comparison between statements, a Levenshtein distance, bag of words comparison, linear comparison, synonym comparison between statements, search for explicit repeatability indicators, or contextual meaning analysis utilizing embeddings.

6. The system of claim 1, wherein a statement comprises an expression of something in speech or text from an individual in a transcript which may occur as an utterance, sentence, or any other segment of speech or text of varying length.

7. The system of claim 1, wherein a repeatability metric comprises a performance metric that quantifies the amount of repetition an individual experiences or utilizes during an interaction.

8. A method comprising:
receiving a plurality of transcripts;
identifying one or more statements in the plurality of transcripts, wherein identifying the one or more statements comprises:
determining a plurality of dimensions for analysis, wherein the plurality of dimensions comprises at least one direct comparison and at least one indirect comparison, wherein the indirect comparison is based upon a corporate standard;
determining two or more repeatability metrics for two or more transcripts of the plurality of transcripts based on the one or more statements;
aggregating the two or more repeatability metrics, wherein aggregating the two or more repeatability metrics further comprises:
selecting an aggregation method based upon a similarity of dimensions across two or more repeatability metrics; and
analyzing the two or more repeatability metrics based on the selected aggregation method; and
comparing the two or more repeatability metrics.

9. The method of claim 8, further comprising:
pre-processing the one or more statements.

10. The method of claim 8, further comprising:
categorizing the two or more repeatability metrics.

11. The method of claim 8, wherein determining a repeatability metric further comprises:
selecting a repeatability scoring method; and
analyzing the one or more statements based on the selected repeatability scoring method.

12. The method of claim 11, wherein a repeatability metric method comprises a word-by-word comparison between statements, character by character comparison between statements, a Levenshtein distance, bag of words comparison, linear comparison, synonym comparison between statements, search for explicit repeatability indicators, or contextual meaning analysis utilizing embeddings.

13. The method of claim 8, wherein a statement comprises an expression of something in speech or text from an individual in a transcript which may occur as an utterance, sentence, or any other segment of speech or text of varying length.

14. The method of claim 8, wherein a repeatability metric comprises a performance metric that quantifies the amount of repetition an individual experiences or utilizes during an interaction.

* * * * *